F. O. REEVES.
HAND POWER HAY PRESS.
APPLICATION FILED OCT. 1, 1909.

987,913.

Patented Mar. 28, 1911.

Witnesses

Fountain O. Reeves, Inventor by Attorneys

UNITED STATES PATENT OFFICE.

FOUNTAIN OSCAR REEVES, OF VANDERVOORT, ARKANSAS, ASSIGNOR OF ONE-HALF TO HENRY M. WILKINS, OF VANDERVOORT, ARKANSAS.

HAND-POWER HAY-PRESS.

987,913.   Specification of Letters Patent.   Patented Mar. 28, 1911.

Application filed October 1, 1909. Serial No. 520,589.

*To all whom it may concern:*

Be it known that I, FOUNTAIN O. REEVES, a citizen of the United States, residing at Vandervoort, in the county of Polk and State of Arkansas, have invented a new and useful Hand-Power Hay-Press, of which the following is a specification.

This invention relates to hand power hay presses.

The objects of the invention are to improve and simplify the construction of such devices as well as to increase their efficiency in operation and to decrease the expense attending their manufacture and use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of the claims without departing from the spirit of the invention.

Figure 1:
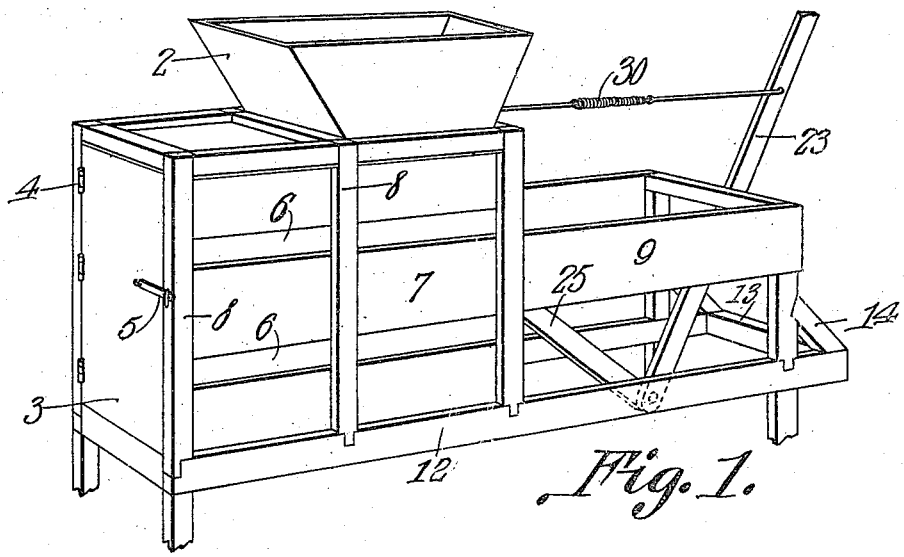
Figure 2:
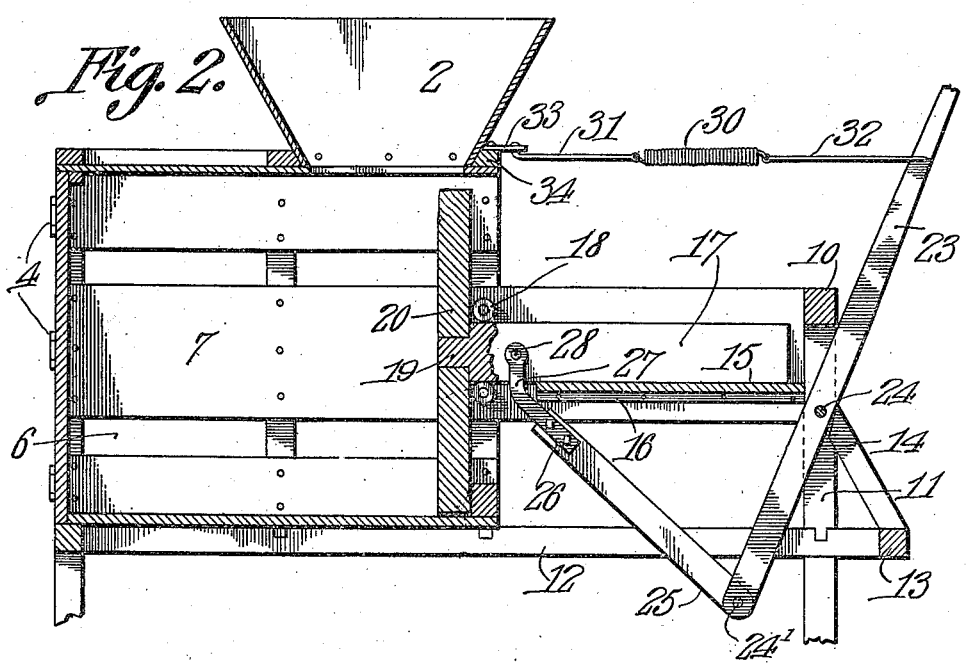

In the accompanying drawings forming a part of this specification:—Figure 1 is a perspective view of a hand power hay press constructed in accordance with the present invention, the legs or supports therefor being broken away. Fig. 2 is a vertical longitudinal section through the device shown in Fig. 1.

Like reference numerals indicate corresponding parts in the different figures of the drawing.

The hay press of the present invention is constructed preferably with a rectangular pressing chamber 1 having at one end thereof an inlet or hopper 2 which is mounted upon the upper portion of the pressing chamber. At the end thereof opposite the inlet hopper 2 the pressing chamber 1 is provided with a door 3 which is secured in position in any suitable manner such as by means of the hinges 4 and is adapted to be locked in closed position in any desired manner such for example, as by means of the latch or other locking device 5. For the purpose of facilitating the application of the tie wire to the bale, after it has been compressed, grooves or openings 6 are formed in the side walls 7 of the pressing chamber 1, the bracing members or strips 8 of said pressing chamber extending across the grooves 6 as shown. The portion or board, of the side walls 7, between the grooves 6, at each side of the pressing chamber 1, preferably is longitudinally extended as indicated at 9 so as to form an end frame in which the operating parts of the hay press are mounted. The two extensions 9—9 of the hay press preferably are connected with each other at their upper edges by the cross piece 10 and are provided with downward extensions or standards 11 which are connected at their lower ends in any suitable manner with the longitudinally extending sills 12 of the hay press. The longitudinal sills 12 preferably are extended beyond the standards 11 and are connected with each other by the cross piece 13.

For the purpose of strengthening the frame work generally and the standards 11 in particular, braces 14 are employed, said braces resting at their lower ends upon the sills 12 and being suitably connected at their upper ends with the standards 11. The extension 9 of the side pieces of the frame, adjacent their lower ends, are connected with each other by the longitudinally extending cross piece 15 shown in Fig. 2, said cross piece having depending flanges 16 by means of which it is secured to the inner surfaces of the longitudinal extension 9. Resting upon the cross piece 15 between the extensions 9, is a plunger rod or shank 17 which, adjacent its forward ends, extends under an anti-friction roller 18 and is formed with a reduced forward end 19 which is fitted into and connected with the plunger head 20.

The means for operating the plunger 20 preferably comprises a main operating lever 23 which is journaled at 24 at a point approximately below the lower portion of the plunger rod or shank 17. At its lower end the operating lever 23 is connected at 24′ with a link 25 which has strapped or otherwise secured at 26 to its forward end a bifurcated bracket 27 the opposite sides of which are pivotally connected at 28 with opposite sides of the plunger rod or shank 17 as shown. By moving the upper end of the operating lever 23 rearwardly, the link 25 serves to feed the plunger 20 forward as will be readily understood.

The means for withdrawing the plunger 20 to inoperative position after the bale of hay has been pressed in the usual manner, consists preferably of a spring 30 provided with straight links or connecting pieces 31 and 32, the connecting piece or link 32 being connected with the upper end of the lever 23 and the connecting piece or link 31 being connected with a plate 33 which is bolted to an upper cross piece 34 extending across the lower end of the hopper 2 as shown.

The hay press of the present invention is strong, simple, durable and inexpensive in construction as well as thoroughly efficient and practical in operation.

What is claimed as new is:—

1. In a hay press, the combination with a horizontally disposed pressing chamber provided with a door at one end and a hopper at the other end, of a plunger provided with a shank, a roller arranged above the shank, and an operating lever having a link connected with said shank.

2. A hay press comprising a horizontally disposed pressing chamber having a door at one end provided with means for locking the same, a hopper at the other end having inclined walls, a plunger in said pressing chamber, a shank connected with said plunger, anti-friction means engaging the upper surface of said shank and an operating lever pivoted approximately in the same plane as the lower surface of said shank, a spring connected with the upper portion of said operating lever and the lower portion of said hopper, a link connected with the lower end of said lever, and a bifurcated member connected with said link and pivotally mounted on opposite sides of the shank of said plunger.

In testimony that I claim the foregoing as my own, I have hereto affixed my signature in the presence of two witnesses.

FOUNTAIN OSCAR REEVES.

Witnesses:
S. S. KIRK,
R. J. MOORE.

---

Copies of this patent may be obtained for five cents each, by addressing the "Commissioner of Patents, Washington, D. C."